United States Patent [19]

Cookson et al.

[11] Patent Number: 5,896,454

[45] Date of Patent: Apr. 20, 1999

[54] SYSTEM AND METHOD FOR CONTROLLING COPYING AND PLAYING OF DIGITAL PROGRAMS

[75] Inventors: Christopher J. Cookson; Lewis S. Ostrover, both of Los Angeles, Calif.

[73] Assignee: Time Warner Entertainment Co., L.P., Burbank, Calif.

[21] Appl. No.: 08/612,567

[22] Filed: Mar. 8, 1996

[51] Int. Cl.$^6$ .................................................. H04N 7/167
[52] U.S. Cl. .................................................. 380/5; 380/4
[58] Field of Search ............................... 380/3, 4, 5

[56] References Cited

U.S. PATENT DOCUMENTS

| | | | |
|---|---|---|---|
| 4,796,220 | 1/1989 | Wolfe | 380/4 |
| 5,371,792 | 12/1994 | Asai et al. | 380/3 |
| 5,418,853 | 5/1995 | Kanota et al. | 380/5 |
| 5,488,410 | 1/1996 | Lieberfarb et al. | 380/5 |
| 5,563,947 | 10/1996 | Kikinis | 380/4 |
| 5,574,787 | 11/1996 | Ryan | 380/5 |

FOREIGN PATENT DOCUMENTS 96-07376   5/1996   WIPO .

*Primary Examiner*—Stephen C. Buczinski
*Attorney, Agent, or Firm*—Gottlieb, Rackman & Reisman, P.C.

[57] ABSTRACT

A system and method for preventing effective copying of digital recordings. A copy-state code accompanies each recording, one state of which represents that no copies at all are to be made of the recording. Compatible players are designed to prevent play of any writable disk which includes a "no-copy" code. It is the inconsistency between the code and the medium containing it that causes play of the medium to be inhibited.

26 Claims, 2 Drawing Sheets

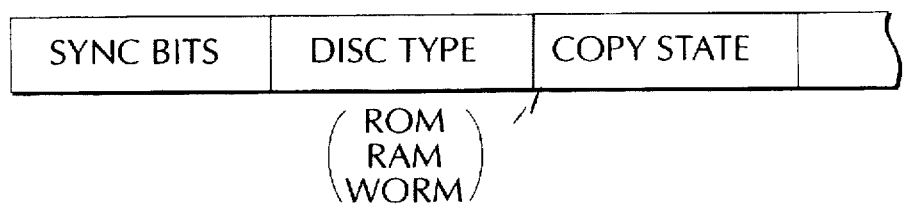
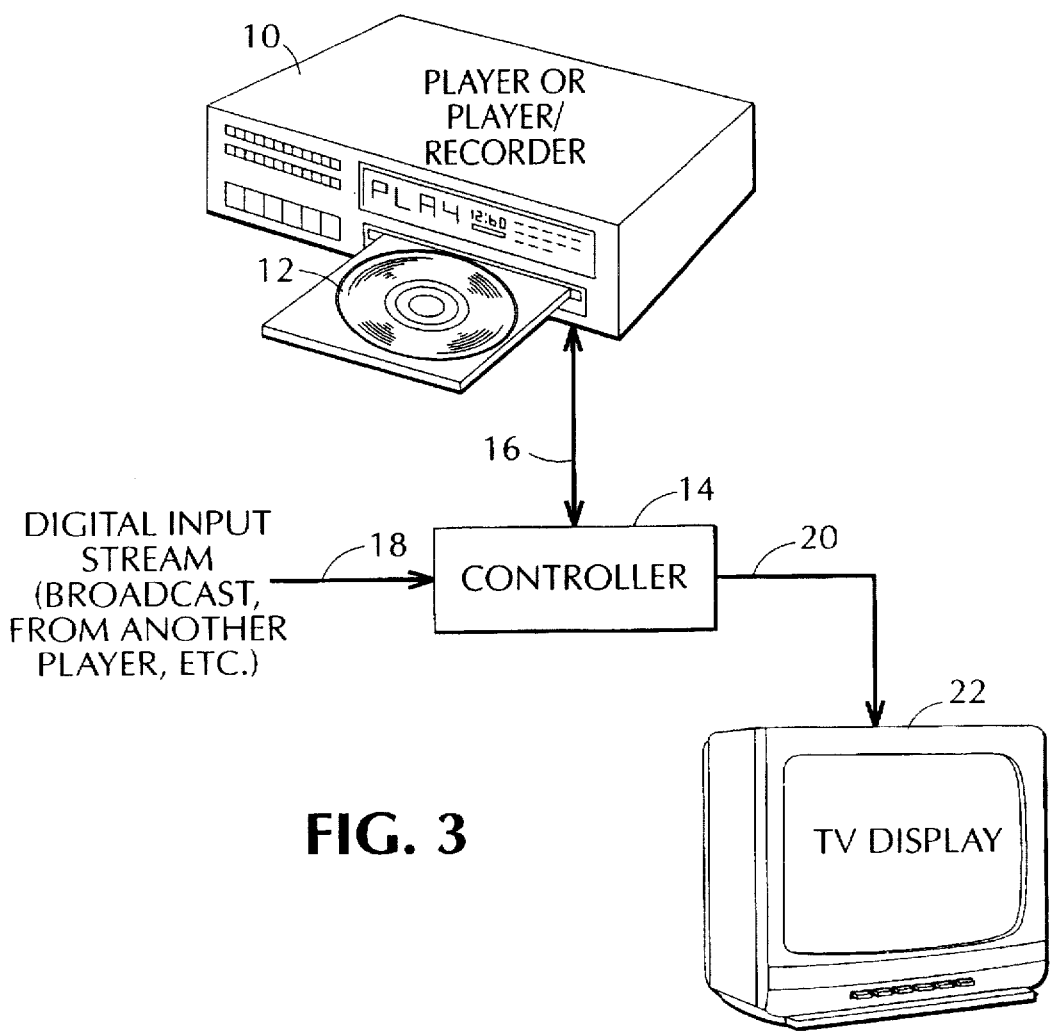

SYSTEM AND METHOD FOR CONTROLLING COPYING AND PLAYING OF DIGITAL PROGRAMS

This invention relates to the unauthorized copying of digital recordings, and more particularly to the play of unauthorized copied digital recordings There have been numerous proposals for preventing the making of unauthorized copies of video and audio programs. While early efforts were directed to preventing the copying of analog signals, more recent concerns have been for the protection of digital recordings. (As used herein, the terms digital recordings, digital programs and the like refer to audio-visual and all other materials represented by digital bit streams.) Efforts in this regard have even extended to the passing of legislation, in the form of the Audio Home Recording Act of 1992, that requires digital recorders used in the home, when making a first generation copy from an original digital recording, to change a copy state code so that the first generation copy will thereafter not be copiable by home digital recorders. Efforts are now underway to prevent illicit copying of digital video materials in much the same way.

The problem with all such schemes is that they are subject to attack by knowledgeable "hackers." Consider, for example, the new digital video disk players that are soon expected to be on the market. Especially when a player will become a peripheral to, or component in, an overall home computer, there will be an accessible bus on which the digital bit stream being played will appear. Access to that bus will allow recording of the bit stream on digital tape or a recordable disk regardless of any codes in the bit stream which indicate that recording is not to be permitted. The problem is not as severe in the case of a self-contained player/recorder. But the opportunity to defeat any anti-copying mechanism is present if there is an "exposed" bus on which the digital bit stream appears; and in the case of home computers, for example, users are even encouraged to open up the case (in order to insert new cards and drives).

It is therefore an object of our invention to provide a system and method for preventing the improper effective copying of digital programs The key word in the preceding sentence is "effective." In accordance with the principles of our invention, it is assumed that illicit copies will be made. Instead of worrying about preventing the making of such copies, however, we control preventing the play of any digital recording by a compatible player if a copy state code in the program (or otherwise on the medium) is inconsistent with the medium containing the program.

The invention can be understood by first considering the closest prior art—digital home recorders that comply with the Audio Home Recording Act. Every original digital recording includes a two-bit code. Two bits can represent four states, but only three of the four states are defined. A first state indicates that the program material is not protected at all. This state applies, for example, to public domain materials. A second state indicates that first-generation copies of the digital program may be made. As man first-generation copies can be made as desired, but second-generation copies may not be made from first-generation copies. Digital recorders, when copying an original recording, must change the copy state code from the second state to the third state. The third state represents that the digital recording is a first-generation copy, and that another copy may not be made of this copy.

A similar scheme has been proposed in the prior art for digital video recordings. Again, a digital video recording will have a two-bit copy state code. One state will represent unlimited generational copying, a second state will represent that only first-generation copies may be made, and a third state will represent that the accompanying digital recording is either a first-generation copy and that it should not be copied, or an original recording that is not to be copied at all, with any recorder complying with the proposed legislation replacing the second copy state code by the third when a first-generation copy is made. The problem with this approach, as explained above, is that if it is possible to access a bus on which the bit stream of a digital recording appears,illicit copies can be made.

Our invention is particularly useful in the context of digital video disk players (although it has application to other media and compatible players as well). There are generally three kinds of disks that can be played on such a device. A ROM disk is a disk into which the information is molded when the disk is pressed, and which can only be played. It is expected that first-generation digital video disks will be of this type. A RAM disk is a read-write type, a disk which can not only be played repeatedly, but also recorded, erased and re-recorded repeatedly A WORM (write-once, read-many) disk is one which can be recorded only once, but played repeatedly. In everything that follows, a "writable" disk includes both RAM and WORM types. A writable disk is one which is molded to allow subsequent recording. (A disk with both ROM and writable sectors or areas is considered herein to be "writable", with the features of the invention applying to the writable sectors or areas, be the sectors or areas in a single layer which includes a ROM portion, or in different layers.) Also, as used herein, a writable medium is one on which digital data can be recorded regardless of what is represented by that data, i.e., any kind of "program" —audio, video, audio-visual, text or data, or any combination thereof. Thus the anti-copying (more accurately, anti-effective copying) features of my invention apply not only to video and audio disks, but even to disks representing nothing but textual information. Also, the term "medium" as used herein includes broadcasts or other transmission technologies.

There are two type of digital bit streams that are of primary concern. The first is that derived from play of a ROM disk, a disk which might contain a two-hour movie using MPEG 2 compression. Typically, the manufacturer of that pressed disk might not wish any copies to be made of it. Accordingly, in the control section or sections of the disk, in those areas containing the copy-state code which specifies what kind of copying is allowed, the code might be 11, indicating that all copies are prohibited. The other most typical form of digital bit stream would be that derived from a digital broadcast, such as an HBO feature film. For time-shifting purposes, only a first-generation copy might be allowed. The copy state code for such a digital bit stream might be 01, indicating that a first-generation copy may be made but that is all.

As in the prior art schemes, when that first-generation copy is made, the state code is changed—from 01 to 10 in the illustrative embodiment of the invention. The 10 code identifies the recording as a first-generation copy, from which no other copies should be made. Any recorder operating on a bit stream containing the state code 10 will not make a second-generation copy.

The fourth state code is 00 and, as in the prior art, represents a digital program that can be copied over and over again, from generation to generation.

Where our invention departs from the prior art is that while illicit copying may be difficult to prevent, effective copying can be prevented simply by building players that will not play back illicit copies.

In the illustrative embodiment of the invention, one of the four possible copy-state codes is present one or more times in the recording. The three codes 00, 01 and 10 all allow play of the disk. It makes no difference whether the disk is ROM or writable. Even with a 10 code, a disk can be played. The 10 code has to do with copying, not playing. The case of interest is a disk that has a 11 code.

If the 11 copy-state code is on a ROM disk, since the code simply means that no copies should be made, there is no reason not to play the disk. (Player/recorder machines will not copy the disk pursuant to the code; they will just play it.) The combination of interest is a 11 code on a writable disk. If the 11 code is on a writable disk, the question is how it got there? A writable disk is one which is not pressed, a disk typically made at home on a player/recorder. Since the code 11 originates on a ROM disk, placed there by a manufacturer who wants no copies to be made of his program material, the only way that the 11 code could appear on a writable disk is if an illicit copy was made. Fortunately, a digital video disk player is capable of determining the kind of disk that it is playing. In fact, a digital video disk player or DVD ROM player must be able to discern the difference between ROM and writable disks to enable proper playback, for example, by appropriate codes in the lead-in section of the disk. A player made in accordance with the principles of my invention does not play a writable disk which contains a 11 ("no copies, ever") code on it. The hacker who somehow gains access to the bit stream derived from a ROM disk which is never to be copied, and who somehow copies it, will be sorely disappointed when he discovers that the disk cannot be played. (This scheme does not guard against the sophisticated hacker who can change the state code from 11 to another 2-bit value. A more rigorous approach in this regard is described below.)

It is important to understand that unlike the conventional prior art anti-copying schemes where only three of the four possible state codes are used, we require that a fourth state also be defined. It is this "no copy, ever" state that offers the maximum protection. It is the inconsistent appearance of a "no copy, ever" code in a digital bit stream read from a medium onto which the bit stream must have been copied that causes the player to abort play. This cannot be accomplished with the prior art codes because none of them appearing in a digital bit stream from a writable disk would be inconsistent with such a bit stream being derived from that disk. Even a 10 code simply means that no more copies should be made, but it does not indicate that there is something illicit about the copy being played.

Further objects, features and advantages of the invention will become apparent upon consideration of the following detailed description in conjunction with drawing, in which:

FIG. 1 depicts symbolically the lead-in section of the track of a digital video disk suitable for use in our invention;

FIG. 2 depicts the two-bit copy-state (copying authorization) codes used in the illustrative embodiment of the invention;

FIG. 3 depicts, in symbolic block diagram form, hardware which implements my invention in the illustrative embodiment thereof.

Figure 4:
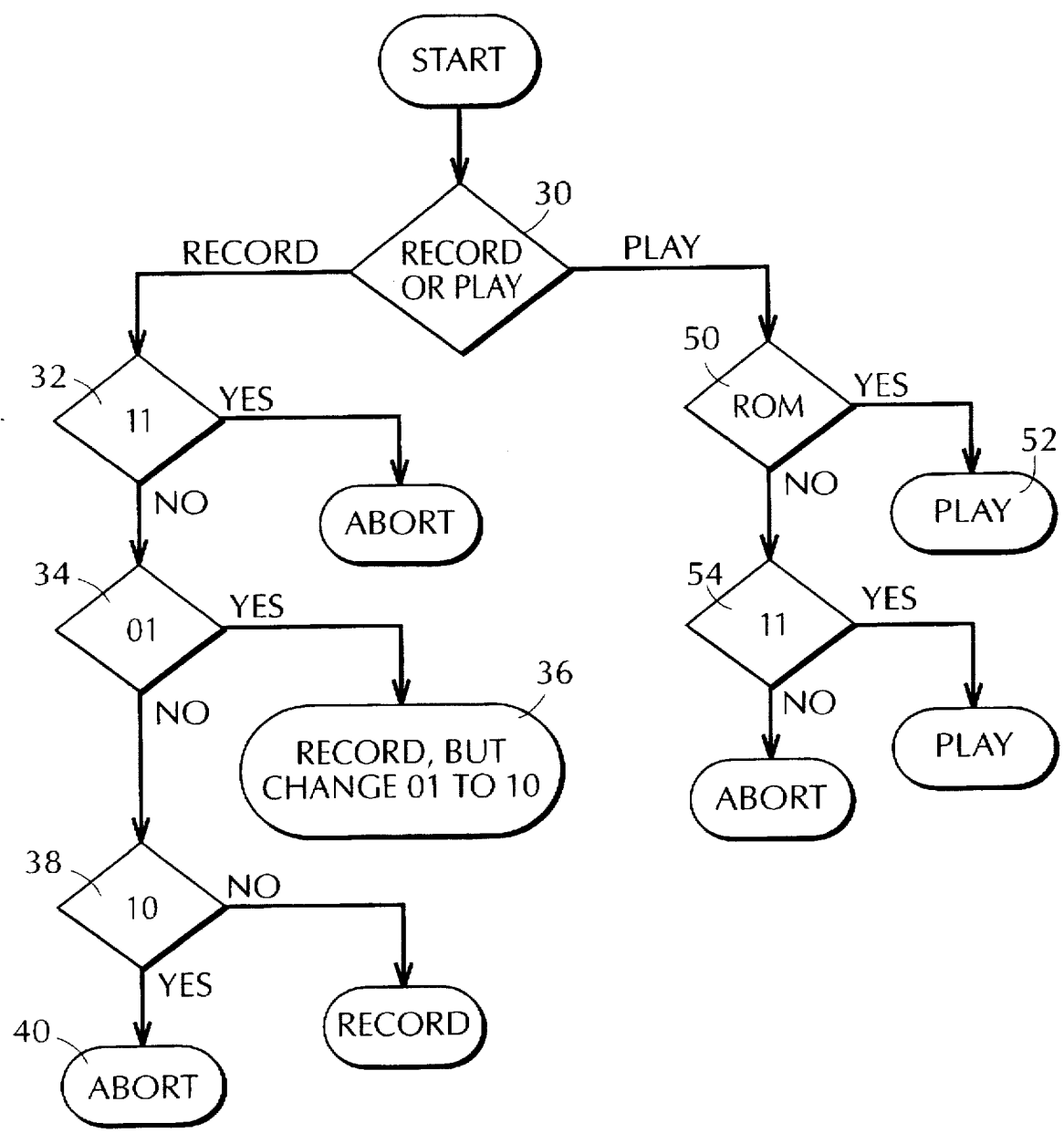
FIG. 4 is a flow chart which illustrates the manner in which recording and playing of disks in the system of FIG. 3 is controlled.

For a more detailed description of a digital video disk player (which can be adapted easily to recording as well, as is known in the art), reference may be made to U.S. Pat. No. 5,463,565 entitled "Data Block Format for Software Carrier and Player Therefor" which issued on Oct. 31, 1995. As disclosed in that patent, a digital video disk may include a lead-in section which contains numerous fields whose contents characterize the remainder of the disk. In the illustrative embodiment of my invention, as shown in FIG. 1 herein, a series of sync bits may be recorded at the start of the lead-in section of the track. The particular order of the succeeding control fields is not particularly important and, as shown in FIG. 1, the first field following the sync bits may represent the type of the disk being played or recorded—ROM, RAM, WORM, or some other type. (Alternatively, the player/recorder might determine the disc type from physical characteristics of the disk or from the way data is recorded on it.) A ROM medium, as discussed above, is typically a pressed disk made in a molding machine; it is possible to read from such a disk, but not to write on it. A WORM disk is one which can be written on only once, but then read repeatedly. Finally, a RAM disk is one which can be written over as well as read, repeatedly, much like the hard drive of a computer.

The third field in the lead-in section (which field may be repeated elsewhere on the disk) contains a two-bit code which represents the copy-state code for the disk. By "copy state" is meant the kind of copying (if any) that is allowed. As shown in FIG. 2, a 00 code indicates that unrestricted copying is allowed, from generation to generation. A 01 code means that first-generation copies are allowed, but when such a copy is made the copy-state code must be updated to 10. The 10 code means that the recording is a first-generation copy of an original, and no copies are to be made of it. Finally, the 11 code means that no copies are ever to be made of the material. All in all, the disks that are compatible with the players of my invention can be grouped in four subsets, each of which includes one of the four copy-state codes.

FIG. 3 is primarily symbolic since the methodology of the invention is implemented for the most part in software. Element 10 is a player, or a player/recorder. It makes no difference for present purposes whether device 10 can just play, or can record as well. Controller 14 is implemented by means of a microprocessor. When reading a disk, the digital bit stream is extended from device 10 to the controller over bus 16. If device 10 can also record, a digital bit stream is extended from the controller over the same bus to the recording sub-system.

Bus 18, extended to the controller, has on it a digital input stream The bits may be derived from any one of many sources. For example the bit stream may be derived from a digital audio broadcast. Or the bit stream may be derived from another audio-video player. In order to record on disk 12, for example, controller 14 must accept a digital bit stream over bus 18 and extend it over bus 16 to player/recorder 10.

Finally, a bit stream extended to controller 14 over bus 18 or bus 16 can be similarly extended, after suitable processing by the controller, over bus 20 to TV display 22. Depending on the 2-bit code in the copy-state field of the bit stream, controller 14 determines whether subsequent bits are extended to the TV display. (Obviously, in the case of a purely audio application, an audio system would be substituted for the TV display.)

The overall operation of controller 14 is depicted in FIG. 4. When a new disk 12 is inserted into the player/recorder 10 (hereinafter, it is assumed that device 10 records as well as plays), the system first determines in step 30 whether that disk is to be played, or the digital input stream on bus 18 is to be recorded on it. If recording is required, a test is performed in step 32 to determine if the copy-state, code is 11. If the code is 11, it is an indication that no recording at all is to take place, and the recording process is aborted.

If copying (recording) of the input bit stream is not prohibited, the system next tests in step 34 whether the copy-state code is 01 . If it is, it is an indication that the input bit stream represents an original recording, e.g., from an HBO broadcast, and that a first-generation copy may be made. However, as indicating in FIG. 2, on the copy thecopy-state code should be changed to 10 to indicate that it is a first-generation copy. As shown in step 36 in FIG. 4, recording is allowed, but the copy-state code is changed from 01 to 10.

If the copy-state code in the input bit stream is not 01, then in step 38 a check is made to see if it is 10. A 10 code represents a first-generation copy, and in such a case the recording process is aborted as indicated in step 40.

on the other hand, if the copy-state code is not 10, there is only one remaining possibility, 00, and recording proceeds.

If the answer to the test in step 30 is that disk 12 is to be played, in step 50 it is determined whether the disk is a pressed disk or a writable disk. If the disk is a ROM disk, then no matter what the copy-state code, play is permitted as indicated in step 52.

On the other hand, suppose that the disk is a writable disk. In step 54, a distinction is made between the 11 copy-state code and the other three. For a 00 code, there is never a problem—unrestricted copying and playing is allowed. A 10 code can only appear on a writable disk, and it is an indication that the disk contains a first-generation copy that may be played. (The 10 code does not appear on an original pressed disk, since this code is created by a home recorder when it plays the pressed disk and changes the original 01 code to a 10 code on the first-generation copy.) The case of the 01 code will be considered below. The important code for present purposes is the 11 code. The appearance of this code read from a writable disk is inconsistent with the very nature of the disk. The 11 code indicates that the material associated with it should never be recorded and yet the material is being read from a disk which was recorded. Consequently, the 11 code on a writable disk is an indication that an illicit copy was made. In step 54 a test is performed to see whether the 11 code appears on a disk which has already been determined in step 50 to be of the writable type. If the 11 code is present, further play is aborted A copy was made, but it is not an effective copy because it cannot be played. On the other hand, any code but the 11 code allows the disk to be played.

It might be thought that a 01 code on a writable disk also represents an inconsistency. The 01 code is placed on an original disk to indicate that only first-generation copies may be made, and any copy which is made from this disk should have its copy-state code changed from 01 to 10. Consequently, a 01 code should never appear on a writable disk. It might be thought that the reading of a 01 code from a disk is inconsistent with the disk being writable, in which case play of the disk should also be aborted. However, it is possible that a consumer might want to create his own programs on writable disks, and if he wants to allow only first-generation copies to be made, then he would typically place a 01 code on the disk. Consequently, there is a case in which a 01 code on a writable disk is not inconsistent in itself. If the home user is allowed only to create writable disks for which unlimited copies (00) are allowed, or for which no copies are allowed (11, or even 10 if it appears on a writable disk), then in step 54 detection of the 01 code might also result in prevention of disk play.

It will be recalled that in the prior art a single state-code has been proposed to represent either an original recording that should not be copied at all or a first-generation copy that should not be copied. In my invention these two cases are represented by different codes. The reason is that the protection is afforded by preventing play (not recording) of an illicit copy, and if both cases were represented by the same code then an original recording that is not to be copied could also not be played. There must be a way to distinguish between legitimate first-generation copies on a writable medium, e.g., an HBO broadcast, and an unauthorized copy on a writable medium of a program that should not have been copied, e.g., a pay-per-view broadcast. When it comes to play of a recording, the only prohibition is against play of a writable medium whose very nature is inconsistent with the copy-state code it contains.

It should also be understood that the code tests of FIG. 4 can be performed repeatedly, e.g., if a copy-state code appears in data blocks other than in just the lead-in section.

With reference to FIG. 3, there are two buses on which digital bit streams appear. Access to the bit streams on the two buses does allow a sophisticated hacker to change the codes. For example, charging a non-00 code to 00 would allow unrestricted generational copies. While it may require a bit of sophistication to do this, there is no question that it can be done, in which case unauthorized copies can be made and played.

To overcome this problem, it is possible to code the original recordings by techniques other than the insertion of bit codes. For example, MPEG 2 compression which will be used on digital video disks entails the storage of three different types of frames, I, B and P. By constraining certain predetermined frames to have a particular order, a form of "watermarks" may be represented in the recording, and this watermark itself may constitute a copy-state code. (This use of watermarks, in and of itself, was suggested in the prior art.) Or even placing certain digital data within particular frames, e.g., steganographically, may represent which kinds of copying are allowed and which kinds of copying are prohibited. The advantages of "watermarking" are threefold: (1) watermarks are harder to detect, (2) they are harder to change, and (3) they are harder to change without destroying the program content. In the case of audio, even when accompanying video, there are prior art techniques for including codes in the content. In all cases, the method of my invention entails looking for a copy-state code in a recording which is inconsistent with the medium containing that code. The invention embraces any kind of indicia in the recording that represents whether copies are allowed or not and, if allowed, the extent of the copying allowed. And because it may be impossible to prevent copying itself, the barrier to effective copying is the prohibition against play of a medium whose copy-state indicia is inconsistent with the medium itself.

Although the invention has been described with reference to a particular embodiment, it is to be understood that this embodiment is merely illustrative of the application of the principles of the invention. For example, a single writable disk might have different sections with different copy-state indicia. Thus it is to be understood that numerous modifications may be made in the illustrative embodiment of the invention and other arrangements may be devised without departing from the spirit and scope of the invention.

We claim:

1. A method for preventing play of digital programs copied without authorization and contained on media which are playable in compatible players, comprising the steps of:
   (a) storing within the programs contained on said media indicia representing whether making copies of said programs is allowed or prohibited,
   (b) enabling said players
      (i) to distinguish between read-only media and writable media, and
      (ii) to determine from said indicia stored within the programs contained on said media whether making copies of said programs is allowed or prohibited, and
   (c) preventing said players from playing writable media containing programs whose stored indicia represent prohibitions against the making of copies.

2. A method in accordance with claim 1 wherein said programs include one or more of audio, video, audio-video, text and data.

3. A method in accordance with claim 2 wherein said indicia are in the form of digital codes.

4. A method in accordance with claim 1 wherein said indicia are in the form of digital codes.

5. A method for preventing play of digital programs copied without authorization and contained on media which are playable in compatible players, comprising the steps of:
   (a) storing on said media in indicia representing copying authorization codes,
   (b) enabling said players
      (i) to distinguish between different types of media, and
      (ii) to determine from said indicia the copying authorization codes for said media, and
   (c) preventing said players from playing media whose represented copying authorization codes are inconsistent with the media themselves.

6. A method in accordance with claim 5 wherein said programs include one or more of audio, video, audio-video, text and data.

7. A method in accordance with claim 6 wherein said indicia are in the form of digital codes.

8. A method in accordance with claim 5 wherein said indicia are in the form of digital codes.

9. A system for preventing play of digital programs copied without authorization and contained on media which are playable in compatible players comprising:
   (a) a plurality of media containing programs which include indicia representing whether making copies of said programs is allowed or prohibited, and
   (b) a plurality of players each including means for
      (i) distinguishing between read-only media and writable media,
      (ii) determining from the indicia stored within the programs contained on said media whether making copies of said programs is allowed or prohibited, and
      (iii) preventing play of writable media with programs whose stored indicia represent prohibitions against the making of copies.

10. A system in accordance with claim 9 wherein said programs include one or more of audio, video, audio-video, text and data.

11. A system in accordance with claim 10 wherein said indicia are in the form of digital codes.

12. A system in accordance with claim 9 wherein said indicia are in the form of digital codes.

13. A system for preventing play of digital programs copied without authorization and contained on media which are playable in compatible players comprising:
   (a) a plurality of media containing both digital programs and indicia representing copying authorization codes, and
   (b) a plurality of players each including means for
      (i) distinguishing between different types of media,
      (ii) determining from said indicia the copying authorization codes for said media, and
      (iii) preventing play of media whose contained indicia represent copying authorization codes which are inconsistent with the media types.

14. A system in accordance with claim 13 wherein said media contain one or more of audio, video, audio-video, text and data programs.

15. A system in accordance with claim 14 wherein said indicia are in the form of digital codes.

16. A system in accordance with claim 13 wherein said indicia are in the form of digital codes.

17. A player for a plurality of media, said media containing programs which include indicia representing whether making copies of said programs is allowed or prohibited, comprising means for distinguishing between read-only media and writable media; means for determining from the indicia included in the programs contained on said media whether making copies of said programs is allowed or prohibited; and means for preventing play of writable media containing programs whose indicia represent a prohibition against the making of copies, and allowing play of read-only media and writable media containing programs whose indicia represent the allowance of copying.

18. A player in accordance with claim 17 wherein said programs include one or more of audio, video, audio-video, text and data.

19. A player in accordance with claim 18 wherein said indicia are in the form of digital codes.

20. A player in accordance with claim 17 wherein said indicia are in the form of digital codes.

21. A player for a plurality of media, said media containing both digital programs and indicia representing copying authorization codes, comprising means for distinguishing between different types of media, means for determining from said indicia the copying authorization codes for said media, and means for preventing play of media whose contained indicia represent copying authorization codes which are inconsistent with the media types.

22. A player in accordance with claim 21 wherein said programs include one or more of audio, video, audio-video, text and data.

23. A player in accordance with claim 22 wherein said indicia are in the form of digital codes.

24. A player in accordance with claim 21 wherein said indicia are in the form of digital codes.

25. A plurality of digital media each of which includes, in addition to program material, one of four copy-state codes to represent whether such program material can be copied without restriction, can be copied to make first-generation copies only, already constitutes a first-generation copy from which additional copies should not be made, or should not be copied at all, with four subsets of the digital media in said plurality including respective ones of the four copy-state codes.

26. A plurality of digital media each of which includes, in addition to program material, at least one code of two types of copy-state codes, one of which represents an authorization to play any medium on which the type of code appears, and the other of which represents a prohibition against play of any writable medium in which the type of code appears, with two subsets of the digital media in said plurality including respective ones of the two types of copy-state code.

* * * * *